(12) United States Patent
Xiao et al.

(10) Patent No.: US 12,084,555 B2
(45) Date of Patent: Sep. 10, 2024

(54) POROUS MATERIALS FOR ENERGY MANAGEMENT

(71) Applicant: Nano and Advanced Materials Institute Limited, Hong Kong (CN)

(72) Inventors: Bin Xiao, Hong Kong (CN); Lik Kuen Ma, Hong Kong (CN); Chao Sun, Hong Kong (CN); Sze Kui Lam, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 260 days.

(21) Appl. No.: 17/447,942

(22) Filed: Sep. 17, 2021

(65) Prior Publication Data

US 2022/0169812 A1   Jun. 2, 2022

Related U.S. Application Data

(60) Provisional application No. 63/198,988, filed on Nov. 30, 2020.

(51) Int. Cl.
| | | |
|---|---|---|
| *C08J 9/00* | (2006.01) | |
| *C08J 9/12* | (2006.01) | |
| *C08J 9/14* | (2006.01) | |
| *C08L 75/08* | (2006.01) | |
| *C08L 79/08* | (2006.01) | |

(52) U.S. Cl.
CPC ............ *C08J 9/0061* (2013.01); *C08J 9/125* (2013.01); *C08J 9/142* (2013.01); *C08J 9/146* (2013.01); *C08J 9/149* (2013.01); *C08L 75/08* (2013.01); *C08L 79/08* (2013.01); *C08J 2201/022* (2013.01); *C08J 2203/10* (2013.01); *C08J 2203/12* (2013.01); *C08J 2203/146* (2013.01); *C08J 2203/182* (2013.01); *C08J 2205/044* (2013.01); *C08J 2375/08* (2013.01); *C08J 2379/08* (2013.01); *C08L 2203/14* (2013.01); *C08L 2207/324* (2013.01)

(58) Field of Classification Search
CPC ............ C08G 18/1808; C08G 18/2063; C08G 18/3206; C08G 18/4804; C08G 18/61; C08G 18/6674; C08G 18/6696; C08G 18/698; C08G 18/7621; C08G 18/7664; C08G 18/7671; C08G 73/1017; C08G 73/1042; C08G 73/1071; C08G 2101/00; C08G 2110/0066; C08G 2110/0083; C08J 9/0061; C08J 9/125; C08J 9/142; C08J 9/146; C08J 9/149; C08J 9/28; C08J 2201/022; C08J 2201/0502; C08J 2201/0543; C08J 2203/10; C08J 2203/12; C08J 2203/146; C08J 2203/182; C08J 2205/042; C08J 2205/044; C08J 2375/08; C08J 2379/08; C08L 75/08; C08L 79/08; C08L 2203/14; C08L 2207/324
See application file for complete search history.

(56) References Cited

U.S. PATENT DOCUMENTS

| | | | |
|---|---|---|---|
| 8,510,863 B2 | 8/2013 | Ferguson | |
| 8,679,206 B2 | 3/2014 | Wan | |
| 8,927,079 B2 | 1/2015 | Leventis et al. | |
| 2004/0094377 A1 | 5/2004 | Jo | |
| 2006/0281825 A1* | 12/2006 | Lee | C08G 18/5024 521/50 |
| 2019/0322790 A1* | 10/2019 | Rider | C08G 18/4825 |
| 2020/0017624 A1* | 1/2020 | Hahn | C08G 18/4829 |

FOREIGN PATENT DOCUMENTS

| | | |
|---|---|---|
| CA | 2212254 A1 | 8/1996 |
| CN | 110903511 A | 3/2020 |
| DE | 102004062875 A1 | 8/2005 |
| EP | 0156941 A2 | 10/1985 |
| EP | 0420242 A2 | 4/1991 |
| EP | 2013257 A1 | 1/2009 |
| WO | 96/23827 A1 | 8/1996 |
| WO | 2007142425 A1 | 12/2007 |
| WO | 2020/053354 A1 | 3/2020 |
| WO | 2020/156800 A1 | 8/2020 |

OTHER PUBLICATIONS

First Office Action of CN2021110960661 issued from the China National Intellectual Property Administration on Mar. 26, 2023.

* cited by examiner

*Primary Examiner* — John M Cooney
(74) *Attorney, Agent, or Firm* — S&F/WEHRW

(57) ABSTRACT

Method for preparing porous polyurethane materials with controlled pore size and shape using isocyanates, polyols, and additives, and the porous polyurethane materials prepared therefrom. Method for preparing porous polyimides using at least one polyamine and a dianhydride and the porous polyimides materials prepared therefrom. The porous materials are useful for energy management, such as thermal, impact and vibration energy, and can exhibit improved fire-resistant performance.

12 Claims, 5 Drawing Sheets

| Nano porous material | | | | |
|---|---|---|---|---|
| Property | NAMI (PU) | NAMI (PI) | Brand 1 | Brand 2 |
| Density, g/cm$^3$ | 0.15 | 0.16 | 0.15 | 0.15 |
| Water contact angle | >150° | ~125° | ~120° | ~100° |
| Thermal-conductivity, W/mK | 0.02 | 0.022 | 0.03 | 0.021 |
| Flammability (FSI) | 72 | 73 | / | / |
| Micro porous material | | | | |
| Property | NAMI (PU) | | Brand 3 | |
| Density, g/cm$^3$ | 0.45 | | 0.45 | |
| EN 1621-1 | Level 2 | | Level 2 | |
| Compressive strength, MPa | 3.88 | | 0.38 | |
| Tensile strength, MPa | 12.2 | | 2.2 | |
| Elongation at break, % | 212 | | 195 | |
| Tear, kN/m | 62.2 | | 1.8 | |
| Hardness | 70 | | 65 | |
| Thickness, mm | 15 | | 15 | |
| Transmission force, kN | 7.6 | | 11.8 | |
| Absorption force, % | 84.8% | | 76.4% | |
| Flammability (FSI) | 74 | | / | |

FIG. 4

POROUS MATERIALS FOR ENERGY MANAGEMENT

CROSS-REFERENCE TO RELATED APPLICATIONS

This application claims priority from U.S. Provisional Patent Application No. 63/198,988 filed on Nov. 30, 2020, the content of which is hereby incorporated by reference in its entirety.

TECHNICAL FIELD

The present disclosure relates to porous materials useful for energy management, such as for use in thermal insulation, and sports equipment to protect the human body from sudden impact, and vibration reduction.

BACKGROUND

The porous materials are a group of polymeric materials used in a wide range of applications due to their unique properties. Porous materials can exhibit the durability and toughness of metal and the elasticity of rubber. By modifying the synthetic conditions and starting materials, the physical properties of the porous materials can be modified, such as thermal conductivity, hardness, elongation, strength, and modulus. Consequently, the porous materials have been widely applied in the construction, sports equipment, and automotive industry, etc for absorbing and dissipating energy, such as thermal, impact and vibration energy.

An effective method for synthesizing porous polyurethane materials is through the reaction of an isocyanate, which contains two or more isocyanate groups (—NCO) and one or more polyol molecules. In general, isocyanates are responsible for the reactivity and curing process of polyurethane materials while polyols are responsible for the flexibility of the polyurethane materials. The most commonly used isocyanates are based on aromatic isocyanates. Polyols that are commonly used in polyurethane material preparation can be classified into polyether polyols or polyester polyols. The molecular weight and chemical structure of the polyols, such as the length of the backbone and number of hydroxyl groups per molecules, can significantly change the properties of polyurethane materials.

Nano-porous polyurethane material has a nanosize porous structure, which can effectively reduce the thermal conductivity of the material. One example of a polyurethane porous material is Blueshift AeroZero® from Blueshift Materials Inc. It is a commercially available polyurethane porous material that is used for thermal insulation, which is a mechanically durable insulating film and is tolerant to very high temperatures.

Micro-porous polyurethane material can be a dilatant or shear thickening material. It can be flexible under normal circumstances and becomes rigid rapidly for a brief period of time, when a sudden impact is applied to it. Therefore, it is also a good candidate for use as an energy-absorbing material for impact protection. It can absorb the direct impact energy from fall or other sudden impact and can significantly achieve impact protection because of their particular and excellent smart softness-stiffness switch performance. The materials may be employed in a wide variety of applications; for example in protective pads or clothing for humans and animals, in or as energy-absorbing parts in vehicles and other objects with which humans or animals may come into violent contact, and in or as packaging for delicate objects or machinery. One of example is D3O®, which is a commercially available impact protection polyurethane porous material, it has been embedded and incorporated into clothing articles, such as headwear and helmets; protective clothing or padding for head, elbows, knees, hips and shins, for professional athletes, soldiers, industrial workers and even electronic devices.

Another use of micro-porous polyurethane material is anti-vibration and impact noise absorption. It can be applied to the building, electronic device, or sportswear. Examples of such use include anti-vibration floor to reduce impact noise and vibration in the gym caused by dropping dumbbells and free weights onto the floor. Another example is a polyether-based polyurethane system for various footwear, produced by sold under the trademark Elastopan® to protect and reduce the vibration transmitted to human feet when doing sport and walking in complex terrain.

However, under certain extreme conditions, such as cold conditions and extreme high-temperature conditions, the existing polyurethane porous materials tend to reduce the dilatant properties and turn brittle, and therefore, it loses the energy-absorbing function and protection effect. Besides, existing thermal insulation polyurethane porous material can lack adequate hydrophobic properties, which limits their wide spread use.

Another type of nano porous material is based on polyimide (P1). Polyimide porous materials can be synthesized through the reaction of dianhydrides and polyamines. By modifying the synthesis conditions and chemical structure, such as length of backbone and core structure, the pore size and porosity can be significantly change, so as achieving different thermal conductivity and hardness. Therefore, it can be used in many aspects, such as aerospace, electrical and microelectronic, for collision, damping, acoustic, and thermal insulation, and dielectric materials.

The above nano and micro porous materials can be particularly easy to ignite and can show a high burning velocity. This is due to the high surface-to-mass ratio, high air permeability, open-cell structure, low aromaticity, and the high oxygen, carbon, and hydrogen content in the polymer matrix. One way to improve the fire-resistance performance is adding a fire retardant that can increase smoke suppression, a carbon or char layer formation, and/or release nitrogen-containing gases at high temperature.

Accordingly, there exists a need to develop improved porous materials with improved properties and that address or overcome at least some of the challenges raised above.

SUMMARY

The porous materials are porous polyurethane or porous polyimide materials, which can exhibit low thermal conductivity and hydrophobic properties, which makes them well suited for use in thermal insulation layers, such as the thermal insulation wall in the building. On the other hand, the present polyurethane porous materials are also suitable for use in the impact or vibration absorption systems with a wide working temperature range where it can still maintain the excellent smart softness-stiffness switch performance and low volume expansion ratios. Consequently, the porous materials described herein are well suited for use in thermal insulation layers, impact-protecting layers and/or anti-vibration layers. The porous materials may be employed in a wide variety of applications, such as in protective pads or clothing for humans and animals, in or as energy absorbing zones in vehicles and other objects with which humans or animals may come into violent contact, and in or as packaging for delicate objects or machinery. Specific examples of applications include thermal insulation board; headwear and helmets; protective clothing or padding for elbows, knees, hips and shins; general body protection, for example for use in environments where flying or falling objects are a hazard.

In a first aspect, provided herein is a method for preparing a porous polyurethane material, the method comprising: providing a first composition comprising an isocyanate and a polyol mixture selected from the group consisting of at least one hydroxyl terminated polyether polyol and ethylene glycol; at least one hydroxyl terminated polyester polyol and ethylene glycol; and at least one hydroxyl terminated polyether polyol, ethylene glycol and hydroxyl terminated silicone oil; providing a second composition comprising at least one polyol, a blowing agent, optionally a pore forming agent, optionally a surfactant, and a catalyst; and combining the first composition and the second composition thereby forming the porous polyurethane material.

In a first embodiment of the first aspect, provided herein is the method of the first aspect, wherein the isocyanate is an alkyl diisocyanate, alkenyl diisocyanate, a cycloalkyl diisocyanate, an aryl diisocyanate, an aralkyl diisocyanate, or a mixture thereof.

In a second embodiment of the first aspect, provided herein is the method of the first aspect, wherein the isocyanate is a diphenylmethane diisocyanate, a phenylene diisocyanate, a toluene diisocyanate, a naphthalene diisocyanate, hexamethylene diisocyanate, isophorone diisocyanate, a methylenebis(cyclohexyl isocyanate), or mixtures thereof.

In a third embodiment of the first aspect, provided herein is the method of the first aspect, wherein the blowing agent is water and the pore forming agent is a monohydric alkyl alcohol.

In a fourth embodiment of the first aspect, provided herein is the method of the first aspect, wherein the catalyst is a Brønsted base or a Lewis acid.

In a fifth embodiment of the first aspect, provided herein is the method of the first aspect, wherein the catalyst is selected from the group consisting of bis(2-dimethylaminoethyl) ether, trimethylamine, triethanolamine and 1, 4 diazabicyclo [2.2.2] octane, zinc naphthenate, dibutyltin dilaurate, and mixtures thereof.

In a sixth embodiment of the first aspect, provided herein is the method of the first aspect, wherein the first composition comprises an isocyanate and hydroxyl terminated silicone oil; and the second composition further comprises at least two solvents.

In a seventh embodiment of the first aspect, provided herein is the method of the sixth embodiment of the first aspect, wherein the hydroxyl terminated silicone oil is a polydimethylsiloxane with an average molecular weight of 400 to 700.

In an eighth embodiment of the first aspect, provided herein is the method of the sixth embodiment of the first aspect, wherein the isocyanate and hydroxyl terminated silicone oil are present in a mass ratio of 100:2 to 100:5.

In a ninth embodiment of the first aspect, provided herein is the method of the sixth embodiment of the first aspect, wherein the at least two solvents comprise an ether and at least one solvent selected from the group consisting of a fluoroether, acetonitrile, dimethyl sulfoxide, acetone, acetylacetone, and mixtures thereof.

In a tenth embodiment of the first aspect, provided herein is the method of the ninth embodiment of the first aspect further comprising the step of exchanging the at least one of the at least two solvents with a fluoroether or acetone; and removing the fluoroether or the acetone by supercritical drying after the step of combining the first composition and the second composition thereby forming the porous polyurethane material.

In an eleventh embodiment of the first aspect, provided herein is the method of the first aspect, wherein the method comprises: providing a first composition comprising a isocyanate selected from the group consisting of a diphenylmethane diisocyanate, a phenylene diisocyanate, a toluene diisocyanate, a naphthalene diisocyanate, hexamethylene diisocyanate, isophorone diisocyanate, and a methylenebis (cyclohexyl isocyanate); at least one hydroxyl terminated polyether polyol, ethylene glycol and hydroxyl terminated polydimethylsiloxane; providing a second composition comprising at least one polyol independently selected from the group consisting of hydroxyl-terminated polybutadiene, hydroxyl-terminated polyether polyols, hydroxyl-terminated polyester polyol, 1,4-butanediol, cyclohexane dimethanol, ethylene glycol, hydroquinone bis(2-hydroxyethyl) ether, trimethylol propane, 1,4-butanediol, 1,6-hexanediol, and a dipropylene glycol; optionally a monohydric alkyl alcohol; optionally water; at least two solvents, wherein one of the at least two solvents is tetrahydrofuran and at least one solvent selected from the group consisting of a 1,1,2,2-tetrafluoroethyl 2,2,2-trifluoroethyl ether, acetonitrile, dimethyl sulfoxide, acetone, acetylacetone; and a catalyst selected from the group consisting of bis(2-dimethylaminoethyl) ether, trimethylamine, triethanolamine and 1, 4 diazabicyclo [2.2.2] octane, zinc naphthenate, and dibutyltin dilaurate; combining the first composition and the second composition; exchanging at least a portion of the at least two solvents with 1,1,2,2-tetrafluoroethyl 2,2,2-trifluoroethyl ether or acetone; and removing the 1,1,2,2-tetrafluoroethyl 2,2,2-trifluoroethyl ether or acetone by supercritical drying thereby forming the porous polyurethane material.

In a twelfth embodiment of the first aspect, provided herein is the method of the first aspect, wherein the polyol mixture is present at a weight percentage between 1-20% relative to the weight of the isocyanate and the polyol mixture.

In a thirteenth embodiment of the first aspect, provided herein is the method of the first aspect, wherein the method comprises: providing a first composition comprising a isocyanate selected from the group consisting of a diphenylmethane diisocyanate, a phenylene diisocyanate, a toluene diisocyanate, a naphthalene diisocyanate, hexamethylene diisocyanate, isophorone diisocyanate, and a methylenebis (cyclohexyl isocyanate) and a polyol mixture comprising at least one hydroxyl terminated polyether polyol and ethylene glycol; or at least one hydroxyl terminated polyester polyol and ethylene glycol; providing a second composition comprising at least one polyol independently selected from the group consisting of hydroxyl-terminated polybutadiene, 1,4-butanediol, cyclohexane dimethanol, ethylene glycol, hydroquinone bis(2-hydroxyethyl)ether, trimethylol propane, 1,4-butanediol, 1,6-hexanediol, and a dipropylene glycol; optionally a monohydric alkyl alcohol; and optionally water; and combining the first composition and the second composition thereby forming the porous polyurethane material.

In a second aspect, provided herein is a porous polyurethane material prepared according to the method of the first aspect.

In a first embodiment of the second aspect, provided herein the porous polyurethane material of the second aspect wherein, the porous polyurethane material comprises pores having an average diameter of 50 μm to 100 μm or 100 μm to 200 μm.

In a third aspect, provided herein is a porous polyurethane material prepared according to the method of the eleventh embodiment of the first aspect.

In a fourth aspect, provided herein is a porous polyurethane material prepared according to the method of the thirteenth embodiment of the first aspect.

In a fifth aspect, provided herein is a method for preparing a porous polyimide material, the method comprising: combining at least one aryl polyamine and an aryl dianhydride in a reaction solvent thereby forming a mixture comprising a polyimide; exchanging at least a portion of the reaction solvent with a fluoroether or acetone; and removing the fluoroether or the acetone by supercritical drying thereby forming the porous polyimide material.

In a first embodiment of the fifth aspect, provided herein is the method of the fifth aspect, wherein the at least one aryl polyamine is selected from the group consisting of a diaminophenyl ether and a triaminophenyl ether; and the aryl dianhydride is a biphenyltetracarboxylic dianhydride.

In a second embodiment of the fifth aspect, provided herein is the method of the fifth aspect, wherein the at least one aryl polyamine is 4,4'-diaminophenyl ether and 1,3,5-tris(4-amino-phenoxy)benzene; and the aryl dianhydride is 3,3',4,4'-biphenyltetracarboxylic dianhydride.

In a third embodiment of the fifth aspect, provided herein is the method of the first embodiment of the fifth aspect, wherein the reaction solvent is N-methyl-2-pyrrolidone and the step of exchanging at least a portion of the reaction solvent is done with acetone.

In a sixth aspect, provided herein is a porous polyimide material prepared according to the method of the fifth aspect.

The present disclosure provides a polyurethane porous material, which can exhibit one or more of the following properties: (1) Lower thermal conductivity and/or excellent hydrophilic properties by conducting nano process engineering to control the porosity and porous size good flexibility and excellent impact energy absorption. Through polymer chain engineering, the open and closed cells with different pore size co-existing structure can be formed, where the open and big cells enhance flexibility, while closed and small cells can absorb the energy. (2) Better mechanical properties by adding the crosslinking agent. Polyolefins can be used as cross linkers, it can be diol or triol, to connect the hard segments and the soft segments thereby creating a double network structure, which can improve the mechanical properties of the material. Generally, hard segments produced from isocyanate and chain extenders, are immobile and stiff, while the soft segments produced from the polyols with high molecular weight, can move freely. (3) Adjustable impact resistance working temperature range by adding a low glass transition temperature segment chain, such as the silicone segment.

Compared with existing polyurethane materials, the compositions described herein provide lower thermal conductivity (0.02 W/mK), excellent hydrophobic property (water contact angle>150°), higher impact-resistant strength which can achieve level 2 of EN 1621-1 impact testing, better mechanical properties and maintain the softer and better flexibility under a wide range of temperature, from −40° C. to 60° C.

BRIEF DESCRIPTION OF TH DRAWINGS

The above and other objects and features of the present disclosure will become apparent from the following description of the disclosure, when taken in conjunction with the accompanying drawings.

FIG. 4 shows a table of the thermal, physical, flammability, and mechanical properties of the micro and nano porous materials described herein and a commercial polyurethane material. The flammability of the porous materials can reach the flame spread index of ~70, which is equal to ASTM E84 Type B standard.

DETAILED DESCRIPTION

Figure 1A:
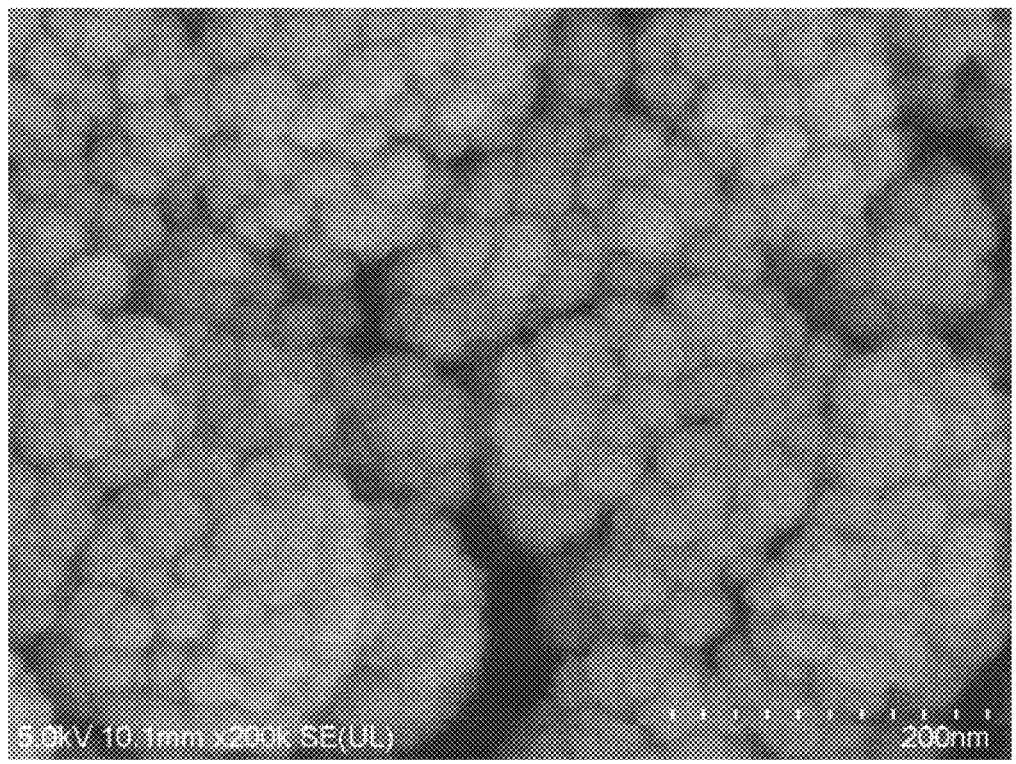
FIG. 1A depicts a scanning electron microscope (SEM) image of nano-processed porous polyurethane material of the invention.

The present disclosure provides a method for preparing a porous polyurethane material, the method comprising: providing a first composition comprising an isocyanate and a polyol mixture selected from the group consisting of at least one hydroxyl terminated polyether polyol and ethylene glycol; at least one hydroxyl terminated polyester polyol and ethylene glycol; and at least one hydroxyl terminated polyether polyol, ethylene glycol and hydroxyl terminated silicone oil; providing a second composition comprising at least one polyol, a blowing agent, optionally a pore forming agent, optionally a surfactant, and a catalyst; and combining the first composition and the second composition thereby forming the porous polyurethane material.

Isocyanates useful in the methods described herein include diisocyanates, diisocyanate uretidiones, polyisocyanate biurets of isocyanates and polyisocyanates, isocyanurates of isocyanates and polyisocyanates, and combinations thereof. The isocyanate may include an isocyanate selected from the group of alkyl isocyanates, alkenyl isocyantes, cycloalkyl isocyanates, aryl isocyanates, aralkyl isocyanates, and combinations thereof. In certain embodiments, the isocyanate is a $C_2$-$C_{12}$ linear or branched alkyl diisocyanate, $C_4$-$C_{12}$ linear or branched alkenyl diisocyanate, a $C_3$-$C_7$ cycloalkyl diisocyanate, or a $C_6$-$C_{12}$ aryl diisocyanate. Exemplary isocyanates, include but at not limited to 2,4-toluene diisocyanate (TDI), 2,6-toluene diisocyanate, trimethyl hexamethylene diisocyanate (TMDI), 2,4-diphenylmethane diisocyanate (MDI), 4,4'-diphenylmethane diisocyanate (MDI), 4,4'-dicyclohexylmethane diisocyanate (H12MDI), 3,3'-dimethyl-4,4'-biphenyl diisocyanate (TODD, dodecane diisocyanate (C12DI), tetramethylene m-xylylene diisocyanate (TMXDI), tetramethylene p-xylylene diisocyanate, 1,4-benzene diisocyanate, trans-cyclohexane-1,4-diisocyanate, 1,5-naphthalene diisocyanate (NDI), 1,6-hexamethylene diisocyanate (HDI), 4,6-xylyene diisocyanate, isophorone diisocyanate (IPDI), and combinations thereof.

In certain embodiments, the at least one hydroxyl-terminated polyether polyol comprises a mixture of low molecular weight polyols having a molecular weight in the range of 100 to 1,999 amu and high molecular weight polyols having a molecular weight in the range of 2,000 to 10,000 amu.

Useful polyols include linear or branched hydroxy-terminated polyols, such as hydroxy-terminated polyester polyols, hydroxy-terminated polyether polyols, hydroxy-terminated polyolefin polyols, and hydroxy-terminated dialkylpolysiloxanes. Exemplary polyols include, but are not limited to hydroxyl-terminated polyether polyol, hydroxyl-terminated polyester polyol, 2-(2-hydroxypropoxy)-propan-1-ol, 2-(2-hydroxy-1-methyl-ethoxy)-propan-1-ol, 4-oxa-2,6-heptandiol, hydroxyl-terminated polybutadiene (HTPB), 1,4-butanediol (BDO), cyclohexane dimethanol, ethylene glycol, hydroquinone bis(2-hydroxyethyl)ether (HQEE), trimethylol propane (TMP), 1,4-butanediol and 1,6-hexanediol. In certain embodiments, the polyol comprises chain extenders, which are usually short chain diols or short chain polyols.

In certain embodiments, the polyol is independently selected from the group consisting of polyether polyols (such as polyethyleneglycol, polypropyleneglycol, polybutyleneglycol, polytetramethylene ether glycol, and the like), bio-polyols, hydroxy-terminated dialkylpolysiloxanes, polyester polyols, polycarbonate polyols, or polyacrylic polyols. The polyol can independently have average molecular weights between 100 to 10,000 amu. In certain embodiments, the polyol comprise a mixture of low molecular weight polyols having a molecular weight in the range of 100 to 1,999 amu and high molecular weight polyols having a molecular weight in the range of 2,000 to 10,000 amu. In certain embodiments, the at least one polyol comprises at least one diol selected from the mixture of hydroxyl-terminated polyether polyol and ethylene glycol or hydroxyl-terminated polyester polyol and ethylene glycol with a molecular weight in the range of 100 to 5,000 amu; and the at least one polyol comprises one or more high molecular weight polyols having a molecular weight in the range of 2,000 to 10,000 amu.

In certain embodiments, the catalyst comprises a Brønsted base. The Brønsted base may act as a catalytic base in the reaction of the isocyanate and the polyol and/or a nucleophilic catalyst, which can act to activate the isocyanate to reaction with the polyol. Accordingly, the catalyst may be any Brønsted base and/or nucleophilic catalyst known in the art. In certain embodiments, the catalyst is an amine. Exemplary amines include, but are not limited to, Hunig's base, pyridine, pyrazine, trimethylamine, triethylamine, N-methyl morpholine, bis(2-dimethylaminoethyl), N-methyl imidazole, piperidine, piperazine, N-methyl pyrrolidine, 1,4-diazabicyclo [2.2.2]octane, quinuclidine, triazabicyclodecene, 1,8-diazabicyclo [5.4.0]undec-7-ene, 1,5-diazabicyclo (4.3.0)non-5-ene, 4-dimethylaminopyridine, and the like.

In certain embodiments, the catalyst is a Lewis acid, which can accelerate the reaction of the isocyanate and the polyol by activating the isocyanate to nucleophilic attack by the polyol. The Lewis acid can be any Lewis acid known in the art. Exemplary Lewis acids include, but are not limited to, metal or metalloid complexes or salts of lead, zinc, tin, zirconium, lithium, cesium, magnesium, antimony, phosphorus, indium, iron, scandium, ytterbium, samarium, titanium, cobalt, nickel, and the like. In certain embodiments, the catalyst comprises zinc naphthenate, dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide, or dibutyltin dilaurate and triethanolamine.

The blowing agent can be any blowing agent known in the art. Exemplary blowing agents include, but are not limited to, a fluorinated alkane, such as tetrafluoropropene, pentafluoropropene, chlorotrifluoropropene, 2-fluoropropene, 1-fluoropropene, 1,1-difluoropropene; a $C_4$-$C_7$ aliphatic hydrocarbon, such as pentane; and water.

The pore forming agent can be a monohydric alcohol, such as a $C_2$-$C_8$ alkyl alcohol, such as 1-butanol, 1-pentaol, 1-hexanol, and the like; or a pore forming agent sold under the trade name SK1900 from SKC Company, ALLchem 3350, KF-28, VOCAllchem 3360, ALLchem 3363, or ALLchem 3365.

In certain embodiments, the second composition further comprises a plasticizer. Exemplary plasticizers include those based on palm oil, phthalate esters and/or adipic acid dodecyl ester.

In certain embodiments, the second composition further comprises one or more solvents. The solvent can be selected from aromatic solvents, haloaromatic solvents, ethers, ketones, sulfoxides, fluoroethers, formamides, esters, haloalkanes, perhaloalkanes, and combinations thereof. Exemplary solvents include, but are not limited to benzene, toluene, chlorobenzene, trifluoromethylbenzene, diethyl ether, dimethoxyethane, tetrahydrofun, tetrahydropyran, dioxane, tert-butyl methylether, dichloromethane, chloroform, 1,2-dichloroethane, carbontetrachloride, acetonitrile, acetone, acetylacetone, 1,1,2,2-tetrafluoroethyl 2,2,2-trifluoroethyl ether, and combinations thereof.

In certain embodiments, the second composition comprises at least two solvents, wherein the first solvent is an ether and the second solvent is a fluoroether, acetonitrile, a sulfoxide, or a ketone. In certain embodiments the first solvent is selected from the group consisting of diethyl ether, dimethoxyethane, tetrahydrofun, tetrahydropyran, dioxane, and tert-butyl methylether; and the second solvent is selected from the group consisting of a fluoroether, acetonitrile, dimethyl sulfoxide, acetone, and acetylacetone.

Advantageously, by first combining the isocyanate with the polyol mixture in the first composition the morphology and physical and chemical properties of the thus porous polyurethane material can be controlled. In certain embodiments, the polyol mixture is present in the first composition in a sub-stoichiometric amount relative to the isocyanate.

In instances in which the first composition comprises an isocyanate and a sub-stoichiometric amount of the polyol mixture, the polyol mixture may be present at a weight percentage of less than 40% wt/wt, less 30% wt/wt, less than 20% wt/wt, less than 10% wt/wt, or less than 5% wt/wt relative to the weight of the isocyanate and the polyol mixture. In certain embodiments, the polyol mixture is present between 1-40% wt/wt, 1-30% wt/wt, 1-20% wt/wt, 1-10% wt/wt, 5-10% wt/wt relative to the weight of the isocyanate and the polyol mixture. In certain embodiments, the polyol mixture is present at less than 0.5 equivalents, less than 0.4 equivalents, less than 0.3 equivalents, less than 0.2 equivalents, less than 0.1 equivalents relative to the isocyanate. In certain embodiments, the polyol mixture is present between 0.01-0.5 equivalents, 0.01-0.4 equivalents, 0.01-0.3 equivalents, 0.01-0.2 equivalents, 0.01-0.1 equivalents relative to the isocyanate.

Porous polyurethane material prepared from a first composition comprising liquidated MDI (the mixture of 2,4-diphenylmethane diisocyanate and 4,4'-diphenylmethane diisocyanate (MDI, sold under the trademark WANNATE®PM-200)) and a mixture of hydroxyl-terminated polyether polyols (sold under the trademark DL-400 from Shangdong Lanxing Dongda Company) and ethylene glycol or hydroxyl-terminated polyester polyols (sold under the trademark HK-4200 from Jining Huakai Company) and ethylene glycol (5% by wt/wt relative to the weight of polyols and the isocyanate) yields an improvement in the transmission force (7.6 kN) relative to the porous polyurethane materials prepared from a first composition comprising only liquidated MDI (30 kN).

In instances in which the first composition comprises an isocyanate and a hydroxyl terminated silicone oil (sold under the trademark DMS-C15 from Gelest, 0.1-10% by wt/wt relative to the weight of silicone oil and isocyanate), the hydroxyl terminated silicone oil may be present in the first composition at less than 10% wt/wt, less than 9% wt/wt, less than 8% wt/wt, less than 7% wt/wt, less than 6% wt/wt, or less than 5% wt/wt relative to the weight of the isocyanate and the hydroxyl terminated silicone oil. The hydroxyl terminated silicone oil may be present in the first composition at 0.1-10% wt/wt, 0.1-9% wt/wt, 0.1-8% wt/wt, 1-8% wt/wt, 2-8% wt/wt, 3-8% wt/wt, 4-8% wt/wt, 5-8% wt/wt, or 6-8% wt/wt relative to the weight of the isocyanate and the hydroxyl terminated silicone oil.

In certain embodiments, at least one of the first composition or the second composition further comprises a fire retardant. In general, fire retardant can be divided into two types: additive flame-retardants and reactive flame-retardants. The additive flame-retardants are introduced into the present isocyanate/polyol mixture by physical adding method, include but not limited to halogenated flame-retardants (TCPP, TMCP), halogen-free flame retardants, such as 9,10-dihydro9-oxa-10-phosphaphenanthrene-10 oxide (DOPO) and graphene, phosphorus flame-retardants (polyphosphate (APP) and dimethyl methylphosphonate (DMMP)), nitrogen flame-retardants, hydroxyl containing inorganic fire retardant (such as aluminum hydroxide, magnesium hydroxide, silicon oxide, titanium oxide, calcium carbonate), a fire retardant sold under the trade name Lydorflam 5001. The reactive flame-retardants participates can participate in the polymerization reaction and bind to the main chain or branch chain of the polymer. The reactive flame-retardants commonly used in polyurethane materials refer to polyols or isocyanates containing phosphorus, silicon and/or nitrogen elements.

The porous materials described herein can provide better fire-resistant properties, which passes the highest-level standard testing (such as ASTME84 and EN13501).

In certain embodiments, the second composition further comprises a surfactant. Exemplary surfactants include, but are not limited to, block polymers of polydimethylsiloxane-polyoxyalkylene, nonylphenol ethoxylates, silicone oils, and the like.

In certain embodiments, the present disclosure provides methods for preparing porous polyurethane materials by the reaction of a first composition comprising an isocyanate and a second composition comprising a polyol. In certain embodiments, the first composition comprises an isocyanate, wherein the isocyanate can be selected from aromatic isocyanates, including liquidated MDI (2,4-diphenylmethane diisocyanate and 4,4'-diphenylmethane diisocyanate), pure MDI powder, TDI, NDI and/or aliphatic isocyanates including HDI, IPDI, and HMDI; the second composition can comprise: one polyol or a mixture of polyols, wherein the polyols can be polyether polyols, polyester polyols and/or silicone based polyols; at least two solvents, one is THF, and another can be selected from MeCN, HFE, DMSO) and/or ACAC; and catalysts selected from a mixture of amine catalysts and/or metal complex catalysts, such as those selected from bis(2-dimethylaminoethyl) ether, trimethylamine, and triethylene diamine (TEDA, also called DABCO, 1,4-diazabicyclo [2.2.2] octane), the metal complex can be the compounds of lead, zinc, and tin. Exemplary catalysts include, but are not limited to zinc naphthenate, dibutyltin dilaurate and triethanolamine.

The porous polyurethane materials described herein can provide higher impact-resistant strength and better mechanical properties, which passes the highest level standard testing (EN 1621-1 level 2) and demonstrate the softer and better flexibility under ultralow temperature.

The present disclosure provides a porous polyurethane material, which can be prepared from a first composition and a second composition. In certain embodiments, the first composition comprises an isocyanate; and the second composition comprises: 3%-90% by weight of polyols comprising one or more low molecular weight polyols and one or more high molecular weight polyols, 1-5% by weight of a plasticizer, 0.05%-4% by weight of catalysts, 1-4% by weight of cross-linkers and/or chain extenders, 0.1%-1.5% by weight of blowing agent, 0.2-0.5% by weight of surfactants and optionally 1-3% by weight pore-creating agent.

In certain embodiments, the porous polyurethane material is prepared from a first composition comprising an isocyanate, wherein the isocyanate can be selected from modified aromatic isocyanates, including polymeric diphenylmethane diisocyanate, 2,4'-diphenylmethane diisocyanate, 4,4'-diphenylmethane diisocyanate, pure MDI powder, TDI, NDI and/or modified aliphatic diisocyanates including HDI, IPDI, and HMDI; and the second composition comprises: 3%-90% by weight of the at least one polyol, wherein the at least one polyol can be polyether polyols and/or bio-polyols. The at least one polyol can comprise high molecular weight polyols (e.g. MW from 2000 to 10000) and low molecular weight polyols (e.g. MW from 100 to 2000), wherein the functionality of the at least one polyols can be diols, triols or more; 1-5% by weight of plasticizer based on palm oil, phthalate esters and/or adipic acid dodecyl ester; a mixture of amine catalysts and/or metal complex catalysts. Amine catalyst can be selected from bis (2-dimethylainoethyl), trimethylamine, and triethylene diamine (TEDA, also called DABCO, 1, 4 diazabicyclo [2.2.2] octane), the metal complex can be the compounds of lead, zinc, and tin, for examples, zinc naphthenate, dibutyltin dilaurate and triethanolamine; a crosslinking agent and/or chain extender agent in a 0.5%-3% by weight of HTPB, BDO, cyclohexane dimethanol, ethylene glycol, HQEE, TMP,1,4-butanediol and 1,6-hexanediol; an optional surfactant selected from the group consisting of block polymers of polydimethylsiloxane-polyoxyalkylene, nonylphenol ethoxylates, silicone oils and some other organic compounds; a blowing argent, such as water; and an optional pore-creating agent, such as a monohydric alkyl alcohol ($C_2$-$C_8$ alkyl alcohol); or a pore-creating agent sold under the trademarks SK1900 from SKC Company, ALLchem 3350, KF-28, VOCAllchem 3360, ALLchem 3363, or ALLchem 3365.

Figure 1B:
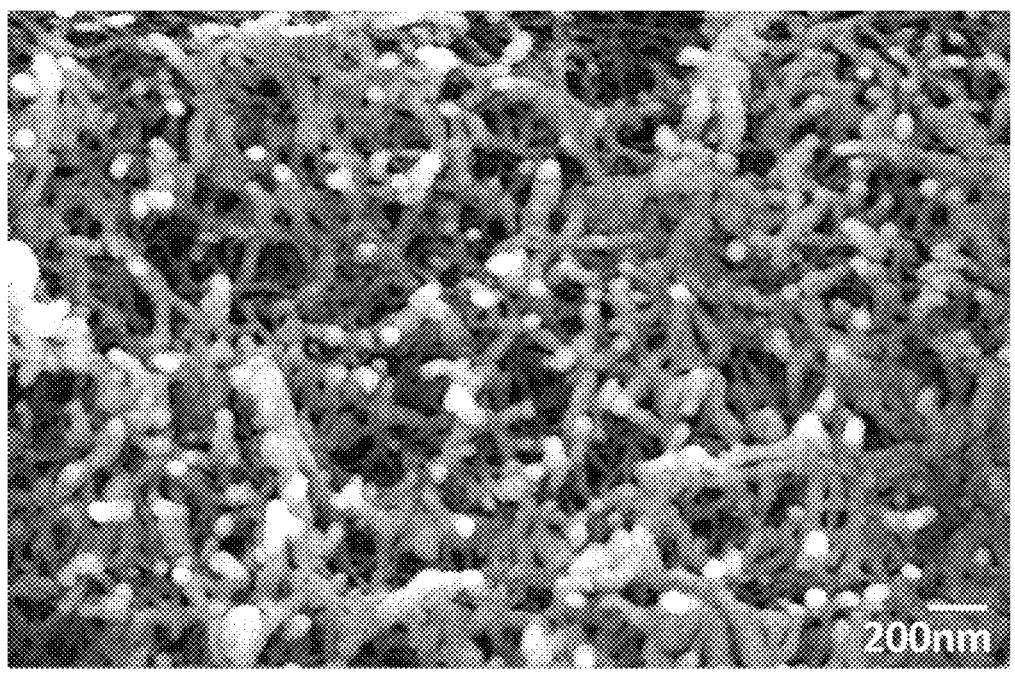
FIG. 1B depicts a scanning electron microscope (SEM) image of nano-processed porous polyimide material of the invention.
Figure 2A:
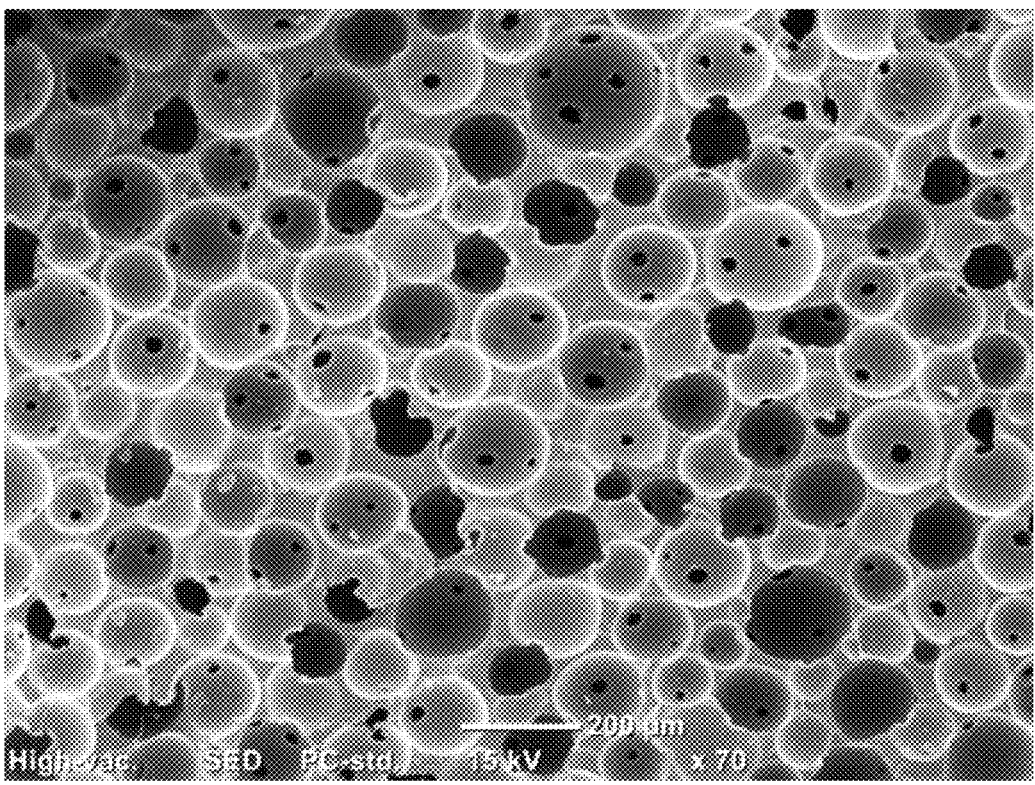
FIG. 2A depicts a SEM image of micro-proceed porous polyurethane material, Brand 3, under lower magnification (×70).
Figure 2B:
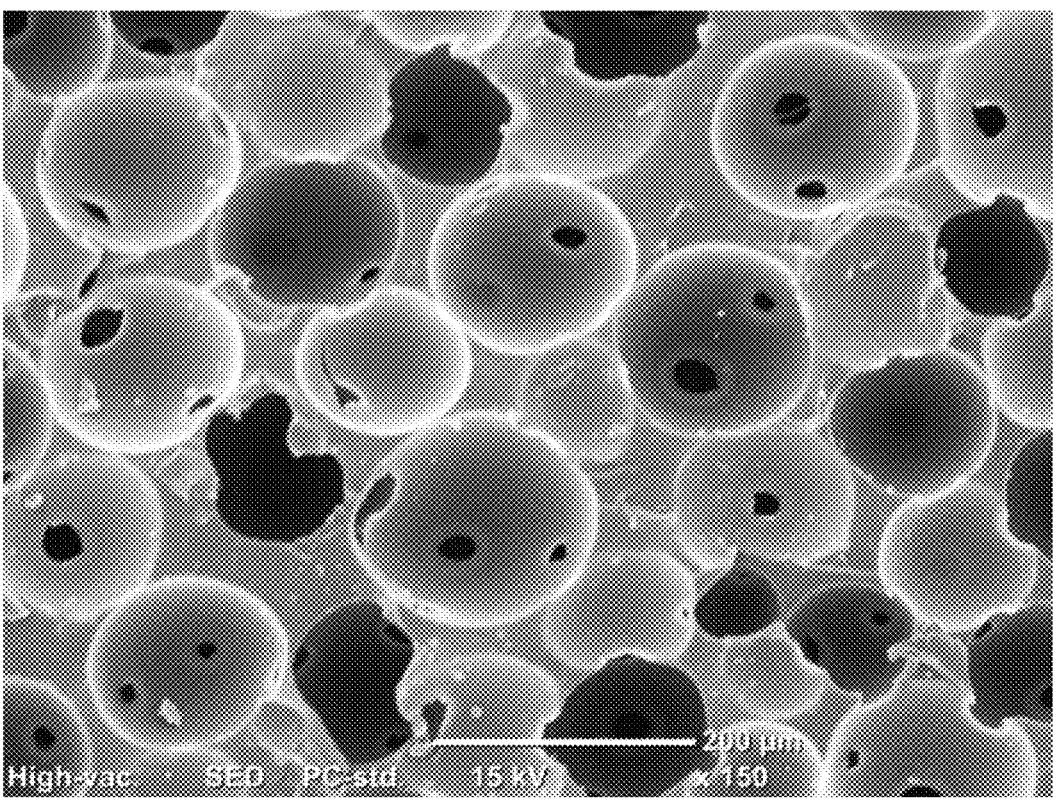
FIG. 2B depicts a SEM image of micro-proceed porous polyurethane material, Brand 3, under higher magnification of (×150).
Figure 3A:
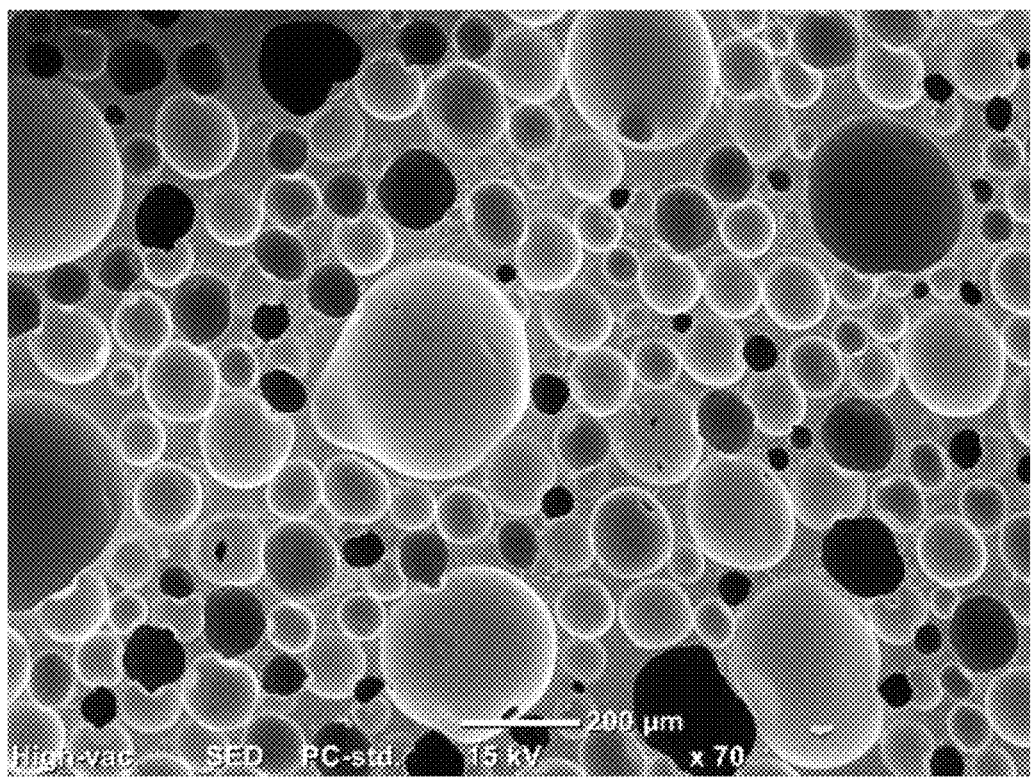
FIG. 3A depicts a SEM image of micro-proceed porous polyurethane material of the invention, under lower magnification (×70).
Figure 3B:
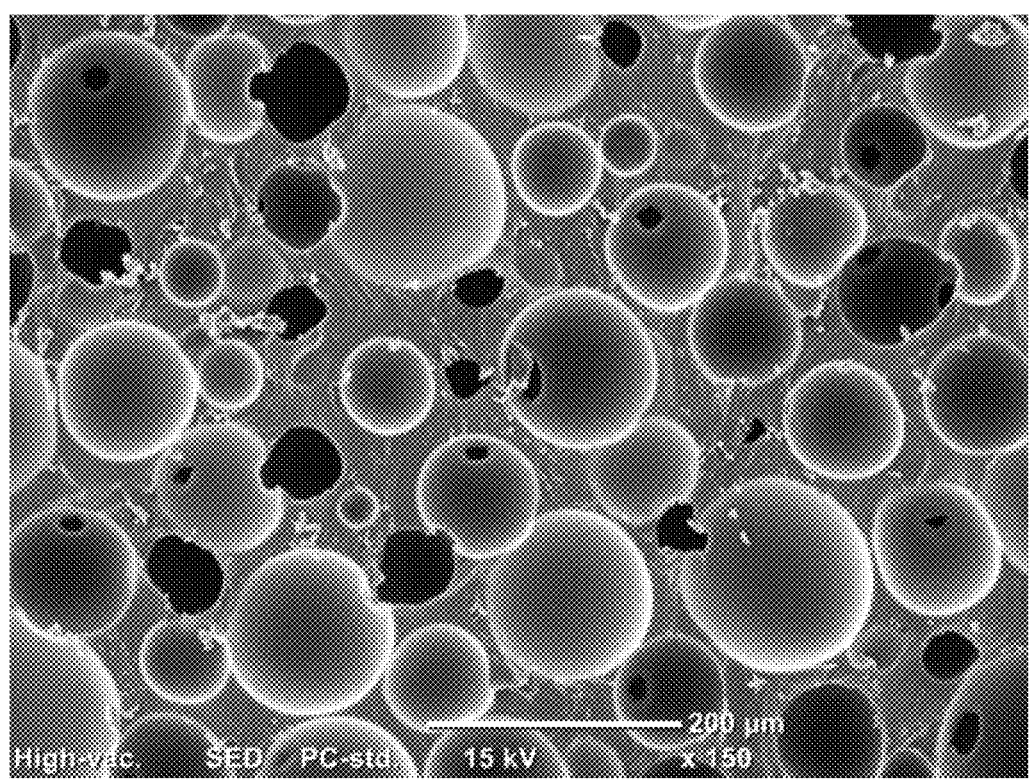
FIG. 3B depicts a SEM image of micro-proceed porous polyurethane material of the invention, under lower magnification (×150).

FIGS. 1A and 1B are depicts SEM images of the porous polyurethane and polyimide material prepared in accordance with the methods described herein and shows the nano-scale porous structure. The structure of the porous materials yields benefits to the thermal energy insulation, lead to achieving the low thermal conductivity, 0.02 W/mK, (Brand 1 and 2 are 0.03 and 0.021 W/mK respectively). In addition, the hydrophobic properties of the porous polyurethane material can be adjusted by the MDI, resulting in achieving the larger water contact angle, 150° (Brand 1 and Brand 2 are 120° and 100°, respectively.) FIG. 2 and FIG. 3 show the SEM image of the porous polyurethane material prepared in accordance with the methods described herein and a commercial porous polyurethane material product. FIG. 2A and FIG. 3A demonstrate that the porous polyurethane material prepared in accordance with certain embodiments described herein can comprise both big and small pore sizes. FIG. 2B and FIG. 3B demonstrate that the porous polyurethane material prepared in accordance with certain embodiments described can comprise both open and closed cells.

FIG. 4 shows the results of EN 1621-1 impact testing. The EN 1621-1 test is a standard and used to assess the protective qualities of armor against mechanical impact while riding a motorcycle. The porous polyurethane material prepared in accordance with the methods described herein can reach Level 2 of protection standard in EN 1621-1 impact testing. In the test, it was discovered that the co-existing microporous structure of the porous polyurethane material described herein can suppress the transmission force to 7.6 kN and absorb 84.8% force which is much lower than the Brand 3 (11.8 kN, 76.4%) with similar density 0.45 g/cm². The co-existing micro-porous structure can also improve the mechanical properties, including compressive strength, tensile strength, tear, hardness and elongation at break compared with commercial porous polyurethane material products as shown in FIG. 4.

Figure 5:
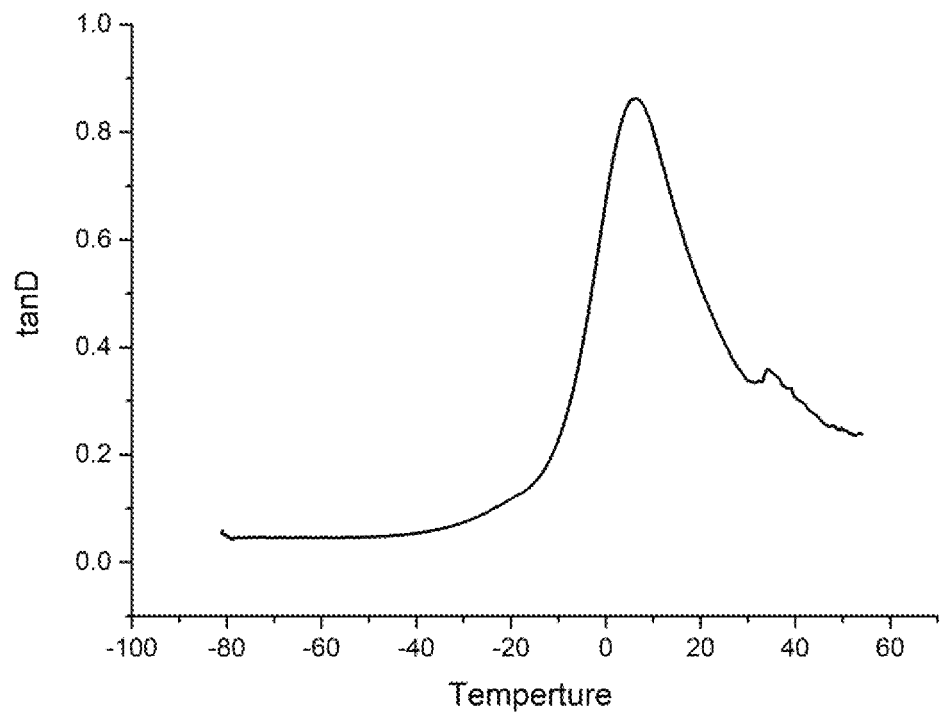
FIG. 5 shows a graph from dynamic mechanical analysis measurement, showing the tan D results of the Micro-proceed porous polyurethane material at different temperature. D is Phase angle, tan D is the tangent of the phase angle and the ratio of Loss modulus to Storage modulus.
Figure 6:
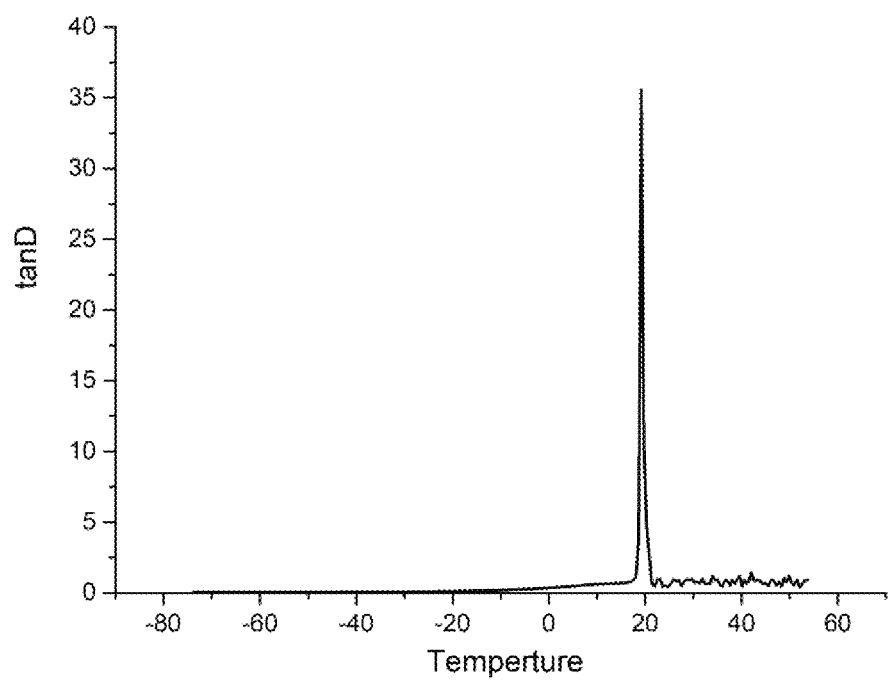
FIG. 6 shows a graph from dynamic mechanical analysis measurement, showing the tan D results of a commercial polyurethane material at different temperatures.

FIGS. 5 and 6 are the results of dynamic mechanical analysis (DMA) of the porous polyurethane material described herein and a commercial porous polyurethane material, respectively. It is a technique to measure the viscoelastic behavior of polymers. In the measurement, sinusoidal stress is applied and the strain in the material under a range of temperature, allowing one to locate the glass transition temperature of the materials. Tan D is the ratio of the loss modulus to the storage modulus, called a damping factor. It measures the energy dissipation of the material and represents how good the material will be at absorbing energy. In the measurement, the porous polyurethane material described herein can maintain energy dissipation ability under a broad range of temperature (−40° C. to 60° C.) while the commercial porous polyurethane material product exhibits a loss of energy dissipation ability under cold temperature conditions (below 0° C.).

The energy absorption of the porous polyurethane material described herein may be used according to those known uses of polyurethanes. However, given excellent performance in EN 1621-1 impact testing and energy absorption under ultra-low temperature conditions, the porous polyurethane material described herein, preferable uses for them is in the sports equipment, such as a head protection helmet, knee protection, shoulder pad etc., to protect the human body from sudden impact, and the vibration absorption layer, such as the floor in the gym. Such products may be formed by casting the reaction mixture into the desired shapes. The moldings also may be made by injection molding.

The present disclosure also provides a method for preparing a porous polyimide material, the method comprising: combining at least one aryl polyamine and an aryl dianhydride in a reaction solvent thereby forming a mixture comprising a polyimide; exchanging at least a portion of the reaction solvent in the mixture comprising a polyimide with a fluoroether or acetone; and removing the fluoroether or the acetone by supercritical drying thereby forming the porous polyimide material.

The at least one aryl polyamine can be an aryl diamine, aryl triamine, aryl tetraamine, or an aryl octaamine.

The aryl diamine can be a diaminobenezene, such as 1,2-diaminobenzene, 1,3-diaminobenzene, and 1,4-diaminobenzene; a diaminobiphenyl, such as 2,2'-diaminobiphenyl, 3,3'-diaminobiphenyl, 3,2'-diaminobiphenyl, 3,4'-diaminobiphenyl, 4,4'-diaminobiphenyl, and 4,2'-diaminobiphenyl; or a diaminophenyl ether, such as 2,2'-diaminophenyl ether, 3,3'-diaminophenyl ether, 3,2'-diaminophenyl ether, 3,4'-diaminophenyl ether, 4,4'-diaminophenyl ether, and 4,2'-diaminophenyl ether.

The aryl triamine can be 1,3,5-tris(4-amino-phenoxy) benzene (TAB) or 4-(4'-aminophenyl)-2,6-bis(4"-aminophenyl)pyridine (TAPP).

The aryl octaamine can be octa(aminophenyl) silsesquioxane (OAPS).

In certain embodiments, the at least one aryl polyamine is 4,4'-diaminophenyl ether and TAB.

The aryl dianhydride can be pyromellitic dianhydride (PMDA), 3,3',4,4'-benzophenetetracarboxylic dianhydride (BTDA), 1,2,3,4-cyclobutanetetracarboxylic dianhydride (CBDA) 3,3',4,4'-biphenyltetracarboxylic dianhydride (BPDA), 2,2',3,3'-biphenyltetracarboxylic dianhydride, and 2,3',3,4'-biphenyltetracarboxylic dianhydride, In certain embodiments, the at least one aryl polyamine is 4,4'-diaminophenyl ether and TAB; and the aryl dianhydride is BPDA.

The reaction solvent can be any polar aprotic solvent that that the reactants are at least partially soluble in under the reaction conditions. Exemplary polar aprotic solvents include, but are not limited to dimethyl sulfoxide, acetonitrile, nitromethane, N-methyl-2-pyrrolidone, and mixtures thereof.

The step of exchanging at least a portion of the reaction solvent can be conducted using any fluoroether that can be removed under supercritical drying conditions, such as 1,1,2,2-tetrafluoroethyl 2,2,2-trifluoroethyl ether.

The initial reaction product of the reaction between the aryl diamine and the aryl dianhydride is an intermediary ring opened polyamide. The intermediary ring opened polyamide may cyclize under the reaction conditions used for the ring opening reaction between the aryl diamine and the aryl dianhydride (thereby forming the polyimide) or the conditions can be modified to induce the cylization. The conditions can be modified by, e.g., heating the mixture comprising the intermediary ring opened polyamide and/or by addition of a reagent or catalyst to induce the cyclization. Common reagents or catalysts useful for inducing the cyclization of the polyamide include, but are not limited to acyl halides, anhydrides, peptide coupling agents (such as EDC, HBTU, and the like), mesylchloride, tosylchloride, $SO_2Cl_2$, Brønsted acids (such as acetic acid), Lewis acids, and the like. The selection of the reaction conditions for the formation of the polyimide is well within the skill of a person of ordinary skill in the art.

In certain embodiments, acetic anhydride is used to induce the cyclization of the polyamide thereby forming the polyimide. Thus, the method for preparing the porous polyimide material can comprise: combining an aryl diamine and an aryl dianhydride in a reaction solvent thereby forming a mixture comprising intermediary ring opened polyamide; combining acetic anhydride with the intermediary ring opened polyamide thereby forming a mixture comprising the polyimide; exchanging at least a portion of the reaction solvent in the mixture comprising the polyimide with a fluoroether or acetone; and removing the fluoroether or the acetone by supercritical drying thereby forming the porous polyimide material.

In the examples below, the porous polyimide material is prepared by the reaction of 4,4'-diaminophenyl ether, TAB, and 3,3',4,4'-biphenyltetracarboxylic dianhydride in NMP thereby forming a polyamide, which is cyclized using acetic anhydride thereby forming the porous polyimide material. The properties of the thus formed polyimide (PI) nano porous material are shown in FIG. 4.

EXAMPLES

Example 1 Preparation of Micro Porous Polyurethane

Preparation of Part A:

85 g-97 g of modified isocyanate, MDI

Preparation of Part B:

At least 4 polyether based polyols (polyether based polyols sold under the trademarks DV-125, HPOP40, 10LD76E and ED-28 from Shangdong Lanxing Dongda Company, 8/58/30/4 g by wt/wt) with different molecular weight were mixed under room temperature (100 g). This mixture then was allowed to react with 5 g of plasticizer based on palm oil; 1 g of chain extender, ethylene glycol (EG); 2 g of dipropylene glycol (DPG); 4 g of crosslinking, hydroxyl-terminated polybutadiene (HTPB); 0.1 g of catalyst, A1 (a mixed solution of 70% bis(2-dimethylaminoethyl) ether); 1 g of catalyst, A-33 (a solution containing 33% trimethylamine); 2.5 g of catalyst, dibutyltin dilaurate; 0.2 g of blowing agent, deionized water; 3 g of Halogen-free flame retardants, Lydorflam 5001; 0.5 g of surfactant, silicone oil.

The energy absorption polyurethane porous materials were then prepared using a one-step method where the mixture of Part A and Part B were poured into the same container and stirred by hand using a spatula for 10-20 s. The homogeneous mixtures then were poured into the mold and the mixture was molded at a pressure of about 600 psi in a heated platen (at temperature 45-55° C.) for 20-30 mins.

Example 2 Preparation of Micro Porous Polyurethane

Preparation of Part A:

39 g-44 g of modified isocyanate, TDI

Preparation of Part B:

At least 2 polyether based polyols (polyether based polyols sold under the trademark HPOP40 and 10LD76E from Shangdong Lanxing Dongda Company, 65/35 g by wt/wt) with different molecular weight were mixed under room temperature (100 g). This mixture then was allowed to react with 2 g of plasticizer based on palm oil, 0.16 g of catalyst, A1, 0.32 g of catalyst, A-33, 0.1 g of catalyst, T-12, 1.5 g of blowing agent, deionized water, 3 g of SK1900 and 0.5 g of surfactants, silicone oil, and 3 g of Halogen-free flame retardants, Lydorflam 5001.

The energy absorption polyurethane porous materials were then prepared using a one-step method as described in Example 1.

Example 3 Preparation of Micro Porous Polyurethane

Preparation of Part A:

35 g of modified isocyanate, MDI This MDI was modified by hydroxyl-terminated polyether polyols (sold under the trademark DL-400 from Shangdong Lanxing Dongda Company, 2% by wt/wt relative to the weight of polyether polyol and isocyanate) and ethylene glycol (3% by wt/wt relative to the weight of ethylene glycol and isocyanate) and hydroxyl-terminated silicone oil (sold under the trademark DMS-C15 from Gelest, 2% by wt/wt relative to the weight of silicone oil and isocyanate).

Preparation of Part B:

At least 2 polyether based polyols (sold under the trademarks DV-125 and ED-28 from Shangdong Lanxing Dongda Company, 65/35 g by wt/wt) with different molecular weight were mixed under room temperature (100 g). One of polyols is palm oil based bio-polyol. With the exception of MDI, the rest of the raw materials were mixed in a paper cup using a mechanical stirrer under room temperature, including 100 g of two different molecular weight of polyols, 0.05 g of catalyst 1, A1, 1 g of catalyst 2, A33, 25 g of crosslinking agent, TEA, 2.5 g of blowing agent of deionized water and 0.6 g of surfactants, silicone oil, and 3 g of Halogen-free flame retardants, Lydorflam 5001, and silicone oil.

The energy absorption polyurethane porous materials were then prepared using a one-step method as described in Example 1.

The properties of the thus formed micro porous polyurethane (PU) material are shown in FIG. 4.

Example 4 Preparation of Nano Porous Polyurethane

Preparation of Part A

Polymeric diphenylmethane diisocyanate (2.96 g, 8.70 mmol from sold under the trademark M20S from BASH) and carbinol (hydroxyl) terminated polydimethylsiloxane (0.12 g, 110-140, sold under the trademark cSt from Gelest) were mixed and stirred at room temperature for 6 hours. Then, THF (20 mL), hydrofluoro ether (10 mL) and MeCN (5 mL) were added and stirred at room temperature for 5 minutes.

Preparation of Part B

Triethylamine (0.50 mL), dibutyl tin dilaurate (0.5 mL), 1.5 g of Halogen-free flame retardants, Lydorflam 5001 and polyether polyols (ED-28 from Shangdong Lanxing Dongda Company, 0.75 g, 0.66 mmol, pre-dissolved in 7 mL DMSO) were prepared.

Part B solution was added into Part A solution and stirred at room temperature for 5 seconds. This resultant solution was casted in an aluminum foil cup and cured at room temperature for 24 hours. Then, the gel was subjected to solvent exchange in acetone for three times. Each solvent exchange proceeded at room temperature for 24 hours. After that, the gel was subjected to carbon dioxide supercritical drying for 3 minutes to afford a pale yellow nanoporous PU material.

The properties of the thus formed nano porous polyurethane (PU) material are shown in FIG. 4.

Example 5 Preparation of Nano Porous Polyimide Material 4,4'-diaminophenyl ether (ODA) (3.16 g, 15.8 mmol), 3,3',4,4'-biphenyltetracarboxylic dianhydride BPDA (4.79 g, 16.3 mmol), and N-methyl-2-pyrrolidone (NMP) (50 mL), phosphorus flame-retardants, ammonium polyphosphate (APP (1 g)) were mixed and stirred at room temperature under nitrogen for 15 min until dissolved. Then, TAB (0.14 g) and NMP (16 mL) were added into the mixture and stirred for 10 min. After that, acetic anhydride (12.3 mL, 130 mmol) and pyridine (10.5 mL, 130 mmol) were added to the mixture. This resultant solution was casted in an aluminum foil cup and cured at room temperature for 24 hours. Then, the gel was subjected to solvent exchange into acetone 3 times. Each solvent exchange proceeded at room temperature for 24 hours. After that, the gel was subjected to supercritical $CO_2$ extraction for 3 mins followed by vacuum drying overnight. The properties of the thus formed polyimide (P1) nano porous material are shown in FIG. 4.

What is claimed is:

1. A method for preparing a porous polyurethane material, the method comprising:
    providing a first composition comprising an isocyanate and a polyol mixture, wherein the isocyanate comprises an aryl isocyanate and the polyol mixture is at least one hydroxyl terminated polyether polyol, ethylene glycol and hydroxyl terminated silicone oil;
    providing a second composition comprising at least one polyol, a blowing agent, optionally a pore forming agent, optionally a surfactant, a catalyst, and at least two solvents; and
    combining the first composition and the second composition thereby forming the porous polyurethane material.

2. The method of claim 1, wherein the isocyanate further comprises an alkyl diisocyanate, an alkenyl diisocyanate, a cycloalkyl diisocyanate, an aralkyl diisocyanate, or a mixture thereof.

3. The method of claim 1, wherein the aryl isocyanate comprises a diphenylmethane diisocyanate, a phenylene diisocyanate, a toluene diisocyanate, a naphthalene diisocyanate, or mixtures thereof.

4. The method of claim 1, wherein the blowing agent is water and the pore forming agent is a monohydric alkyl alcohol.

5. The method of claim 1, wherein the catalyst is a Brønsted base or a Lewis acid.

6. The method of claim 1, wherein the catalyst is selected from the group consisting of bis(2-dimethylaminoethyl) ether, trimethylamine, triethanolamine and 1, 4 diazabicyclo [2.2.2] octane, zinc naphthenate, dibutyltin dilaurate, and mixtures thereof.

7. The method of claim 1, wherein the hydroxyl terminated silicone oil is a polydimethylsiloxane with an average molecular weight of 400 to 700.

8. The method of claim 1, wherein the aryl isocyanate and hydroxyl terminated silicone oil are present in a mass ratio of 100:2 to 100:5.

9. The method of claim 1, wherein the at least two solvents comprise an ether and at least one solvent selected from the group consisting of a fluoroether, acetonitrile, dimethyl sulfoxide, acetone, acetylacetone, and mixtures thereof.

10. The method of claim 9 further comprising the step of exchanging the at least one of the at least two solvents with a fluoroether or acetone; and removing the fluoroether or acetone by supercritical drying after the step of combining the first composition and the second composition thereby forming the porous polyurethane material.

11. The method of claim 1, wherein the method comprises:
    providing the first composition comprising the isocyanate selected from the group consisting of a diphenylmethane diisocyanate, a phenylene diisocyanate, a toluene diisocyanate, and a naphthalene diisocyanate; at least one hydroxyl terminated polyether polyol, ethylene glycol and hydroxyl terminated polydimethylsiloxane;
    providing the second composition comprising at least one polyol independently selected from the group consisting of hydroxyl-terminated polybutadiene, hydroxyl-terminated polyether polyols, hydroxyl-terminated polyester polyol, 1,4-butanediol, cyclohexane dimethanol, ethylene glycol, hydroquinone bis(2-hydroxyethyl)ether, trimethylol propane, 1,4-butanediol, 1,6-hexanediol, and a dipropylene glycol; optionally a monohydric alkyl alcohol; water; at least two solvents, wherein one of the at least two solvents is tetrahydrofuran and at least one solvent selected from the group consisting of a 1,1,2,2-tetrafluoroethyl 2,2,2-trifluoroethyl ether, acetonitrile, dimethyl sulfoxide, acetone, acetylacetone; and a catalyst selected from the group consisting of bis(2-dimethylaminoethyl) ether, trimethylamine, triethanolamine and 1, 4 diazabicyclo [2.2.2] octane, zinc naphthenate, and dibutyltin dilaurate;
    combining the first composition and the second composition;
    exchanging at least a portion of the at least two solvents with 1,1,2,2-tetrafluoroethyl 2,2,2-trifluoroethyl ether or acetone; and removing the 1,1,2,2-tetrafluoroethyl 2,2,2-trifluoroethyl ether or acetone by supercritical drying thereby forming the porous polyurethane material.

12. The method of claim 1, wherein the polyol mixture is present at a weight percentage between 1-20% relative to the weight of the isocyanate and the polyol mixture.

* * * * *